(12) United States Patent
Adler

(10) Patent No.: US 9,908,099 B2
(45) Date of Patent: Mar. 6, 2018

(54) FINE PARTICLE SIZE ACTIVATED CARBON

(71) Applicant: Cabot Corporation, Boston, MA (US)

(72) Inventor: Gerald D. Adler, Charlestown, MA (US)

(73) Assignee: Cabot Corporation, Boston, MA (US)

(*) Notice: Subject to any disclaimer, the term of this patent is extended or adjusted under 35 U.S.C. 154(b) by 355 days.

(21) Appl. No.: 14/601,817

(22) Filed: Jan. 21, 2015

(65) Prior Publication Data
US 2015/0202594 A1 Jul. 23, 2015

Related U.S. Application Data

(60) Provisional application No. 61/929,624, filed on Jan. 21, 2014.

(51) Int. Cl.
B01D 53/02 (2006.01)
B01J 20/28 (2006.01)
B01J 20/20 (2006.01)
B01J 20/10 (2006.01)
B01D 53/64 (2006.01)
B01D 53/10 (2006.01)
B01D 53/83 (2006.01)
B01J 20/30 (2006.01)
C01B 32/366 (2017.01)

(52) U.S. Cl.
CPC ........ *B01J 20/28004* (2013.01); *B01D 53/02* (2013.01); *B01D 53/10* (2013.01); *B01D 53/64* (2013.01); *B01D 53/83* (2013.01); *B01J 20/103* (2013.01); *B01J 20/20* (2013.01); *B01J 20/3021* (2013.01); *C01B 32/366* (2017.08); *B01D 2251/108* (2013.01); *B01D 2253/102* (2013.01); *B01D 2253/106* (2013.01); *B01D 2253/25* (2013.01); *B01D 2253/304* (2013.01);

(Continued)

(58) Field of Classification Search
CPC ........ B01D 2251/108; B01D 2253/102; B01D 2253/106; B01D 2253/25; B01D 2253/304; B01D 2257/602; B01D 2258/0283; B01D 53/02; B01D 53/10; B01D 53/64; B01D 53/83; B01J 20/103; B01J 20/20; B01J 20/28004; B01J 20/3021; C01B 31/086; C01P 2004/60; C01P 2004/61; F23J 2215/60; F23J 2219/30; Y02P 20/129
See application file for complete search history.

(56) References Cited

U.S. PATENT DOCUMENTS 6,027,755 A * 2/2000 Henderson ............... B01J 20/12
426/253
6,168,709 B1 * 1/2001 Etter ....................... C10B 55/00
208/131

(Continued)

FOREIGN PATENT DOCUMENTS

WO WO 2012/030560 A1 3/2012

OTHER PUBLICATIONS

The International Search Report and The Written Opinion of the International Searching Authority, or the Declaration of International Patent Application No. PCT/US2015/012219, dated May 7, 2015.

*Primary Examiner* — Christopher P Jones

(57) ABSTRACT

Disclosed herein are activated carbon having a particle size distribution of $d_{95}$ ranging from 1 μm to 28 μm and a $d_{95}/d_{50}$ ratio ranging from 1.5 to 3, compositions comprising such activated carbons and methods of making the same, and methods of mercury removal from flue gas generated from coal combustion by injecting activated carbon into the flue gas.

10 Claims, 8 Drawing Sheets

(52) U.S. Cl.
CPC ............... *B01D 2257/602* (2013.01); *B01D 2258/0283* (2013.01); *C01P 2004/60* (2013.01); *C01P 2004/61* (2013.01); *F23J 2215/60* (2013.01); *F23J 2219/30* (2013.01); *Y02P 20/129* (2015.11)

(56) References Cited

U.S. PATENT DOCUMENTS

| | | | |
|---|---|---|---|
| 7,722,843 B1 | 5/2010 | Srinivasachar | |
| 8,080,088 B1 | 12/2011 | Srinivasachar | |
| 8,551,431 B1 | 10/2013 | Adams et al. | |
| 9,314,767 B2 * | 4/2016 | McMurray | B01J 20/28004 |
| 2004/0118748 A1 * | 6/2004 | Lesemann | B01J 20/103 |
| | | | 208/211 |
| 2004/0168972 A1 * | 9/2004 | Hughes | B01D 39/1661 |
| | | | 210/502.1 |
| 2005/0039598 A1 * | 2/2005 | Srinivasachar | B01D 53/10 |
| | | | 95/134 |
| 2005/0112056 A1 * | 5/2005 | Hampden-Smith | B01J 20/041 |
| | | | 423/651 |
| 2015/0251159 A1 * | 9/2015 | McMurray | B01J 20/28004 |
| | | | 95/90 |
| 2016/0038871 A1 * | 2/2016 | Li | B01D 53/78 |
| | | | 95/36 |

\* cited by examiner

_US 9,908,099 B2_

FINE PARTICLE SIZE ACTIVATED CARBON

RELATED APPLICATION

This Application claims priority to U.S. Prov. App. No. 61/929,624, filed Jan. 21, 2014, the disclosure of which is incorporated herein by reference.

FIELD OF THE INVENTION

Disclosed herein are fine particle size activated carbon, methods for making such activated carbon, and methods of mercury removal using the activated carbon.

BACKGROUND

Due to air quality and emissions regulations, utility plants that burn coal must often treat any flue gas to ensure it contains only certain levels of regulated compounds, such as nitrogen oxides ($NO_x$), sulfur oxides ($SO_x$), and heavy metals, such as mercury. Typically, sorbents are injected into the flue gas to adsorb mercury impurities prior to exhaustion of the gas into the environment. While much development has focused on improved mercury removal, more stringent federal mercury compliance standards are likely forthcoming. Accordingly, there remains a constant need for developing sorbents for mercury removal.

SUMMARY

One embodiment provides a method of mercury removal, comprising:
injecting activated carbon into flue gas generated from coal combustion,
wherein the activated carbon has a $d_{95}$ particle size distribution ranging from 1 μm to 28 μm and a $d_{95}/d_{50}$ ratio ranging from 1.5 to 3.

Another embodiment provides a method of preparing a fine particle size activated carbon, comprising:
subjecting an activated carbon feedstock having a $d_{95}$ particle size distribution of no more than 20 mm to at least one process selected from air classifying and milling to form the fine particle size activated carbon having a $d_{95}$ particle size distribution ranging from 1 μm to 28 μm and a $d_{95}/d_{50}$ ratio ranging from 1.5 to 3.

A method of mercury removal, comprising:
injecting activated carbon into flue gas generated from coal combustion,
wherein the activated carbon has a $d_{95}$ particle size distribution ranging from 1 μm to 28 μm and a $d_{50}$ particle size distribution ranging from 8 μm to 18 μm.

Also disclosed are activated carbons prepared according to the methods disclosed herein.

One embodiment provides a composition comprising activated carbon having a particle size distribution of $d_{95}$ ranging from 1 μm to 25 μm. In one embodiment, the composition comprises silica, such as fumed silica.

Another embodiment provides a composition comprising activated carbon having a particle size distribution of $d_{95}$ ranging from 1 μm to 28 μm and a ratio of $d_{95}/d_{50}$ ranging from 1.5 to 3.

BRIEF DESCRIPTION OF THE DRAWING(S)

DETAILED DESCRIPTION

Figure 1:
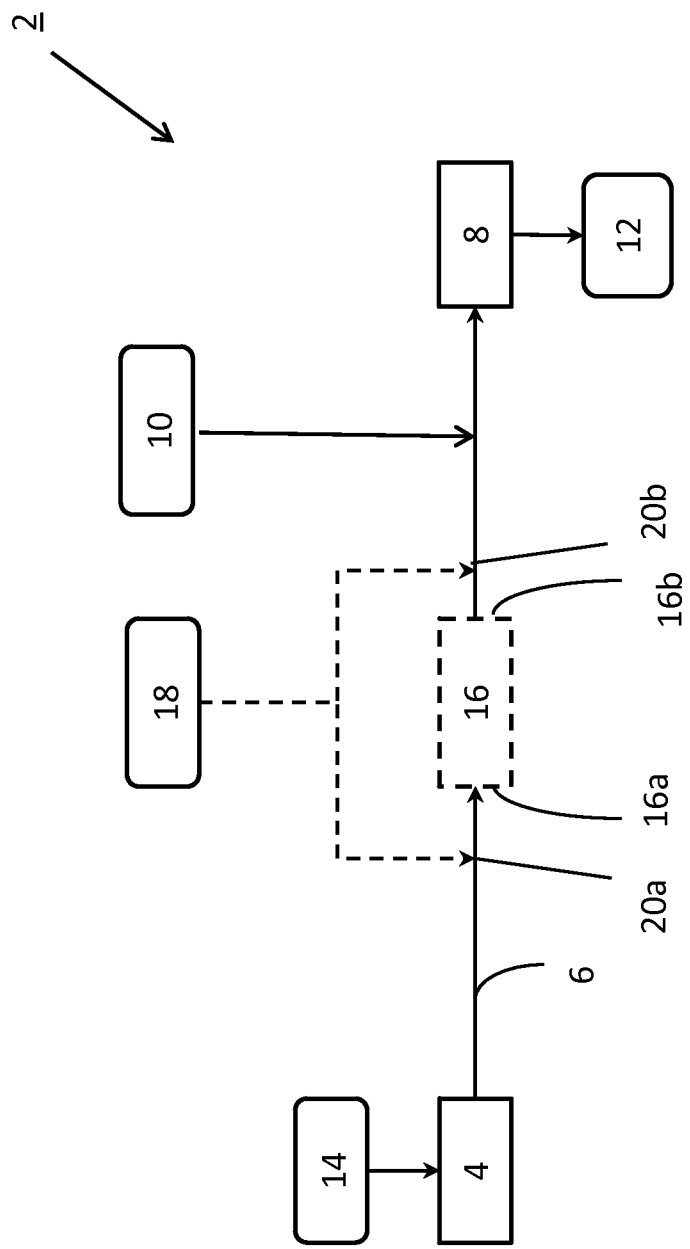
FIG. 1 is a flow chart illustrating a basic configuration of a coal-fired power plant including the pathway of the flue gas upon coal combustion.

Disclosed herein is a fine particle size activated carbon. Also disclosed are methods for making fine particle size activated carbon and its use in adsorbing mercury from flue gas streams, e.g., flue gas emitted from coal-fired power plants.

While fine particle size sorbent materials may seem ideal for adsorbing impurities such as mercury impurities, these sizes are not employed for one or more reasons, including difficulty of transporting/handling the materials, excessive wear and abrasion on mechanical units, containment, and time and expense for their preparation in relation to larger sized materials.

Fine particle size materials are often formed from coarser (e.g., granular or coarse powders) materials using various methods and devices known in the art, such as pulverizers, crushers, jet mills, roller mills, ball mills, hammer mills, and classifiers (e.g., air classifiers). However, many of these devices are not capable of certain particle size distributions due to the mechanical/power limitations, mill configurations, etc.

Disclosed herein are methods of forming fine particle size activated carbon as indicated by a $d_{95}$ particle size distribution, where $d_{95}$ represents the particle size of 95% of the particle population on a volume basis. Particle size can be determined by any method known in the art, such as an LS™ 13 320 or an LS™ 200 Laser Diffraction Particle Size Analyzer, both available from Beckman Coulter.

Activated carbon is often used as a sorbent in many applications, such as the removal of impurities. For example, activated carbon is a typical sorbent for the removal of mercury from flue gas. Without wishing to be bound by any theory, the fine particle size activated carbons disclosed herein can enhance Hg removal from flue gas due to its having a high specific external surface area. Because the contact time between the sorbent and the flue gas is typically very short, such as several seconds at most (e.g., in applications such as mercury removal in power plants configured with electrostatic precipitators and fabric filters), there is insufficient time for Hg to bind to internal surfaces of the sorbent (i.e., surface area deep inside the pores of the particle). Instead, Hg binds primarily to the external surface, which is readily accessible in the available time before the sorbent is removed. Reducing the size of the material as measured by $d_{95}$ at a constant $d_{50}$ increases the specific external surface area of an activated carbon sorbent to the maximum extent possible at a given $d_{50}$, thereby improving the sorbents ability to remove Hg from flue gas in this application. It is well known in the art that a material with a smaller $d_{50}$ will consistently outperform materials with a larger $d_{50}$ if the same particle size distribution is in place. However, it has been discovered that performance is improved by adjusting the overall particle size distribution, such as by reducing $d_{95}$.

In another embodiment, the sorbent has a small a ratio of $d_{95}$ to $d_{50}$, e.g., a $d_{95}/d_{50}$ ratio ranging from 1.5 to 3. It has been discovered that sorbents possessing such $d_{95}/d_{50}$ ratios can achieve improved performance at a given degree of flowability. The flow characteristics of a powder are largely affected by the median particle size, where flow is typically more difficult with smaller particle sizes and/or wider particle size distributions. By generating a narrower particle size distribution at a given median particle size, performance and flow can both be maximized. Additionally, by utilizing a narrower particle size distribution to allow flow in a given system, a smaller median particle size may be utilized as well, thereby further increasing the potential for improved performance.

Without wishing to be bound by theory, because performance of an activated carbon is believed to be driven by external specific surface area at such short contact times, internal pore structure and internal surface area are generally not useful parameters in assessing Hg removal performance. As such, materials with a higher density will often underperform a lower density product on a weight basis, but perform equally on a volumetric basis. Without wishing to be bound by theory, when comparing two materials with very similar $d_{50}$ but different $d_{95}$ values, the material with lower $d_{95}$ will outperform the other.

One embodiment provides activated carbon having a $d_{95}$ particle size distribution ranging from 1 μm to 28 μm, e.g., from 1 μm to 27 μm, from 1 μm to 26 μm, from 1 μm to 25 μm, from 1 μm to 23 μm, from 1 μm to 20 μm, from 1 μm to 18 μm, from 1 μm to 15 μm, from 1 μm to 10 μm, from 3 μm to 28 μm, from 3 μm to 27 μm, from 3 μm to 26 μm, from 3 μm to 25 μm, from 3 μm to 23 μm, from 3 μm to 20 μm, from 3 μm to 18 μm, from 3 μm to 15 μm, 3 μm to 10 μm, from 5 μm to 28 μm, from 5 μm to 27 μm, from 5 μm to 26 μm, from 5 μm to 25 μm, from 5 μm to 23 μm, from 5 μm to 20 μm, from 5 μm to 18 μm, from 5 μm to 15 μm, or from 5 μm to 10 μm.

In one embodiment, the activated carbon has a $d_{95}/d_{50}$ ratio ranging from 1.5 to 3, e.g., from 2 to 3 or from 2.5 to 3.

In one embodiment, the activated carbon disclosed herein can have a particle size distribution characterized by a mean or $d_{50}$ particle size distribution ranging from 1 μm to 18 μm, e.g., from 1 μm to 15 μm, from 1 μm to 13 μm, from 1 μm to 10 μm, from 3 μm to 18 μm, from 3 μm to 15 μm, from 3 μm to 13 μm, from 3 μm to 10 μm, from 4 μm to 18 μm, from 4 μm to 15 μm, from 4 μm to 13 μm, from 4 μm to 10 μm, from 5 μm to 18 μm, from 5 μm to 15 μm, from 5 μm to 13 μm, from 5 μm to 10 μm, from 8 μm to 18 μm, from 8 μm to 15 μm, from 8 μm to 13 μm, from 9 μm to 18 μm, from 9 μm to 15 μm, or from 9 μm to 13 μm.

In another embodiment, the activated carbon disclosed herein can have a particle size distribution characterized by a $d_{90}$ particle size distribution ranging from 1 μm to 20 μm, e.g., from 1 μm to 15 μm, from 1 μm to 12 μm, from 1 μm to 10 μm, from 3 μm to 20 μm, from 3 μm to 15 μm, from 3 μm to 12 μm, from 3 μm to 10 μm, from 5 μm to 20 μm, from 5 μm to 15 μm, from 5 μm to 12 μm, or from 5 μm to 10 μm.

In another embodiment, the activated carbon disclosed herein can have a particle size distribution characterized by a $d_{99.9}$ particle size distribution ranging from 1 μm to 15 μm, e.g., from 1 μm to 15 μm, from 1 μm to 12 μm, from 1 μm to 10 μm, from 3 μm to 15 μm, from 3 μm to 12 μm, from 3 μm to 10 μm, from 5 μm to 15 μm, from 5 μm to 12 μm, or from 5 μm to 10 μm.

Another embodiment provides a method of preparing a fine particle size activated carbon, comprising:

subjecting an activated carbon feedstock having a $d_{95}$ particle size distribution of no more than 20 mm to at least one process selected from air classifying and milling to form the fine particle size activated carbon having a $d_{95}$ particle size distribution ranging from 1 μm to 28 μm and a ratio of $d_{95}/d_{50}$ ranging from 1.5 to 3.

In one embodiment, the activated carbon feedstock has a $d_{95}$ particle size distribution of no more than 10 mm.

In one embodiment, the feedstock can be any activated carbon obtained by carbonizing/activating (which may occur separately or concurrently, e.g., via steam, gas, and/or chemical treatment at high temperature, such as in a kiln) a raw material as a carbonaceous source. In one embodiment, useful activated carbons can be any obtained from raw materials selected from peat, wood, lignocellulosic materials, biomass, waste, tire, olive pits, peach pits, corn hulls, rice hulls, petroleum coke, lignite, brown coal, anthracite coal, bituminous coal, sub-bituminous coal, coconut shells, pecan shells, and walnut shells, and other raw materials known in the art. These raw materials can be carbonized and activated (e.g., steam activation, gas activation, or chemical activation) to form the activated carbon feedstock. In one embodiment, the activated carbons disclosed herein are lignite-based activated carbons or bituminous coal-based activated carbons (e.g., derived from lignite or bituminous coal).

In one embodiment, the activated carbon feedstock has a $d_{95}$ particle size distribution of no more than 20 mm, e.g., no more than 10 mm, no more than 5 mm, no more than 1 mm, no more than 750 μm, no more than 500 μm, or no more than 250 μm, no more than 100 μm, or no more than 50 μm. The feedstock may be in granular or powdered form.

In one embodiment, the activated carbon feedstock is subjected to at least one process that forms particles having a $d_{95}$ particle size distribution ranging from 1 μm to 28 μm. In one embodiment, the at least one process is selected from air classifying and milling. In one embodiment, the at least one process is air classifying, where air classifiers (also known as air separators or cyclone separators) achieve separation by forcing particles upward with a pressurized gas (e.g., air) within an annular, cylindrical, or conical passage. In one embodiment, this passage is a cyclone separator or similar. In another embodiment, this passage is a mill body, which may or may not have internal structures to promote flow patterns. Smaller particles are sufficiently entrained in the conveying gas to pass through a centrifugal separator. In general, the centrifugal separator (often an air classifier wheel) spins at very high speeds such that larger particles (which are less entrained at a given gas velocity relative to smaller particles) are rejected and returned to the milling zone for additional grinding. The air stream can be provided by a number of devices known in the art, including compressors or induced draft fans. In one embodiment, the air classifier contains a classifier wheel, and the disclosed $d_{95}$ particle size distribution (e.g., from 1 μm to 28 μm) is achieved by operating at a wheel speed ranging from 20% to 120% of the rated maximum wheel speed, e.g., from 50% to 120%, from 80% to 120%, from 20% to 100%, from 50% to 100%, or from 80% to 100% of the rated maximum wheel speed.

In another embodiment, the at least one process is selected from milling, e.g., jet milling or hammer milling. In one embodiment, the milling is selected from jet milling in which the particles are jetted into a chamber and particle-particle attrition achieves size reduction. In another embodiment, the milling is achieved by hammer milling in which the feedstock particles impact rotating blades or hammers, resulting in particle size reduction.

In one embodiment, the at least one process is a combination of milling and air classifying, whether concurrently or in series. For example, an air classifier mill applies a pressurized air flow to carry the feedstock particles through an impact mill (e.g., a hammer mill), reducing the particle size, and subsequently subjected to further classification. Coarser particles are rejected by the air classifier and may be conveyed back to the mill for further milling and particle size reduction. An example of an air classifier mill is Mikro-ACM® 100 hammer mill/air classifying mill available from Hosokawa.

As an alternative, an air classifier mill can be supplemented with an external eductor loop, which is a recycle loop that draws material away from the classifier zone and mixes it with the feed material. An example of this mill is a Mikro e-ACM® Air Classifying Mill from Hosokawa ("eACM"). Evacuation of the material from the top of the mill chamber (i.e., the classifier wheel zone) reduces the time for reject material to return to the grinding zone, as the process no longer relies on gravity alone for this step. Because of this external recycle, there is also no need for shrouding inside the mill chamber. Additionally, for a standard ACM, the feed material is often introduced above the rotor disk whereas for an eACM, the feed material is introduced below the rotor disk with the sweep gas such that the feed material is pneumatically drawn into the mill via the air inlet. Feeding material below the rotor disk ensures at least one pass through the grinding area (the gap between the grinding tips/hammers and the liner) before encountering the classifier wheel, resulting in higher throughput than a standard ACM. The throughput of ACMs scale directly with the power of the drive motor such that a 100 HP model can achieve roughly 6.6 times the throughput of a 15 HP model. However, if the throughput of a 15 HP eACM and a 100 HP standard design ACM are compared, the smaller eACM can roughly equate the throughput of the much larger mill.

A jet mill air classifier reduces particle size by particle-particle attrition. The conveying gas can carry the particles upward to a classifier. The coarser particles are not sufficiently entrained in the conveying gas and are too large to pass through the rotating classifier. These large particles are rejected by the classifier wheel and are returned to the jet milling chamber for additional size reduction. An example of a jet mill/air classifier is an Alpine AFG 400 jet mill available from Hosokawa. In one embodiment, for a jet mill, the disclosed $d_{95}$ particle size distribution (e.g., from 1 μm to 28 μm) is achieved by controlling the horsepower normalized throughput of the jet mill in units of lb/(hr-hp). In one embodiment, the jet milling is operated at a horsepower normalized throughput ranging from 0.1 to 2 lb/(hr-hp), e.g., from 0.1 to 1.5 lb/(hr-hp), from 0.1 to 1.25 lb/(hr-hp), from 0.1 to 1 lb/(hr-hp), from 0.1 to 0.75 lb/(hr-hp), from 0.1 to 0.5 lb/(hr-hp), 0.2 to 2 lb/(hr-hp), e.g., from 0.2 to 1.5 lb/(hr-hp), from 0.1 to 1.25 lb/(hr-hp), from 0.2 to 1 lb/(hr-hp), from 0.2 to 0.75 lb/(hr-hp), or from 0.2 to 0.5 lb/(hr-hp).

In one embodiment, the at least one process is selected from air classifying/milling, e.g., with an air classifier mill (e.g., with hammer milling). In one embodiment, the air classifier mill is operated with a classifier wheel, and the disclosed $d_{95}$ particle size distribution (e.g., from 1 μm to 28 μm) is achieved by operating at a wheel speed ranging from 20% to 120% of the rated maximum wheel speed, e.g., from 50% to 120%, from 80% to 120%, from 20% to 100%, from 50% to 100%, or from 80% to 100% of the rated maximum wheel speed. In another embodiment, the disclosed $d_{95}$ particle size distribution (e.g., from 1 μm to 28 μm) is achieved by controlling the air flow rate relative to the grinding power, as indicated by a horsepower-adjusted air flow rate in units of aCFM/hp (air flow rate/grinder power). In one embodiment the air classifier mill is operated at a horsepower-adjusted air flow rate ranging from 10 to 150 aCFM/hp, e.g., from 10 to 125 ACFM/hp, from 10 to 100 ACFM/hp, from 25 to 150 aCFM/hp, e.g., from 25 to 125 ACFM/hp, from 25 to 100 ACFM/hp, from 50 to 150 aCFM/hp, e.g., from 50 to 125 ACFM/hp, or from 50 to 100 ACFM/hp.

In another embodiment, the at least one process is selected from air classifying/milling, e.g., with a jet mill/air classifier performed in series. In one embodiment, for a jet mill, the disclosed $d_{95}$ particle size distribution (e.g., from 1 μm to 28 μm) is achieved by controlling the horsepower normalized throughput of the jet mill in units of lb/(hr-hp). In one embodiment, the jet milling is operated at a horsepower normalized throughput ranging from 0.1 to 2 lb/(hr-hp), e.g., from 0.1 to 1.5 lb/(hr-hp), from 0.1 to 1.25 lb/(hr-hp), from 0.1 to 1 lb/(hr-hp), from 0.1 to 0.75 lb/(hr-hp), from 0.1 to 0.5 lb/(hr-hp), 0.2 to 2 lb/(hr-hp), e.g., from 0.2 to 1.5 lb/(hr-hp), from 0.1 to 1.25 lb/(hr-hp), from 0.2 to 1 lb/(hr-hp), from 0.2 to 0.75 lb/(hr-hp), or from 0.2 to 0.5 lb/(hr-hp).

In another embodiment, the at least one process is selected from milling and air classifying performed in series. In one embodiment, a crusher or pulverizer mill can be initially used to generate a powder having a $d_{95}$ greater than 31 micron (e.g., a coarse powder, such as a powder ranging from 31 to 200 μm). The disclosed $d_{95}$ particle size distribution (e.g., from 1 μm to 28 μm) can be achieved by subjecting this coarse powder stream to air classifying (e.g., via cyclone) to separate particles having less than a threshold size (e.g., from 1 μm to 28 μm) from larger particle sizes (coarse fraction). Optionally, the larger particles (e.g., $d_{95}$ particle size distribution greater than 28 μm, at least 50 μm, at least 100 μm, at least 250 μm, at least 500 μm, or at least 1 mm) may then be further milled and classified, e.g., with a mill having internal air classification technology to produce a material with the disclosed $d_{95}$ particle size distribution (e.g., from 1 μm to 28 μm). The two streams may then be reblended to generate the disclosed $d_{95}$ particle size distribution (e.g., from 1 μm to 28 μm).

The feedstock activated carbon that is classified and/or milled can be a carbonaceous activated carbon, or a treated activated carbon (e.g., steam or chemically activated). In one embodiment, the feedstock activated carbon is chemically treated, e.g., halogenated, such as fluorinated, chlorinated, brominated, or iodinated. In one embodiment, the feedstock activated carbon is carbonaceous and is chemically treated after classifying and/or milling (e.g., halogenated, such as fluorinated, chlorinated, brominated, or iodinated after classifying and/or milling).

In one embodiment, the fine particle size activated carbon disclosed herein can be used as a sorbent for purification applications. In one embodiment, the fine particle size activated carbon can be used as a sorbent for mercury removal, e.g., from flue gas generated by coal combustion in coal-fired power plants. Accordingly, another embodiment provides a method of mercury removal, comprising:

injecting activated carbon into flue gas generated from coal combustion, wherein the activated carbon has a $d_{95}$ particle size distribution ranging from 1 µm to 28 µm and a ratio of $d_{95}/d_{50}$ ranging from 1.5 to 3.

Mercury removal or mercury adsorption is understood as removing or adsorbing elemental or ionic forms of mercury.

FIG. 1 is a flowchart showing the basic configuration of a power plant 2. Power plant 2 can be an operational power plant, an experimental testing site, a pilot plant, or a lab scale model. Coal 14 is supplied to a boiler 4 containing water. Combustion of the coal 14 by boiler 4 heats the water to generate steam, causing flue gas to exit boiler 4 via the pathway indicated by arrow 6 through an economizer (not shown) positioned between the boiler and sorbent injection. Particulate sorbent 10 is injected downstream of boiler 4, resulting in adsorption of the mercury impurity onto sorbent 10. A particle collection device 8 separates spent sorbent 12 from the gas flow. The particle collection device 8 can comprise one or more devices known in the art, such as an electrostatic precipitator (ESP), fabric filter, or baghouse.

Optionally power plant 2 can be configured to have an air preheater 16 positioned between boiler 4 and particle collection device 8, where air preheater 16 cools the flue gas exiting the boiler, which can attain temperatures up to above 2000° F. Upstream of air preheater inlet 16a is termed the "hot side" whereas downstream of air preheater outlet 16b is termed "cold side" as temperatures can decrease by one or more hundred degrees Fahrenheit. Sorbent 10, although shown to injected downstream of air heater 16, can be injected at the cold side or the hot side of air heater 16.

Flue gas in operation power plants often contain other impurities that can interfere with the adsorption of mercury impurities. For example, the $SO_3$, a common impurity in flue gas, can compete with mercury impurities for adsorption sites on the activated carbon. To determine the efficiency of mercury removal in the presence of $SO_3$, FIG. 1 shows a source of $SO_3$ 18 for spiking controlled amounts into the flue gas either upstream 20a or downstream 20b of the air preheater 16.

The basic configuration of FIG. 1 can be configured in a variety of different ways After separation of the spent sorbent 12, the flue gas can be subjected to further treatment or purification via, e.g., scrubbers for removing other flue gas pollutants such as $SO_x$ and $NO_x$, additional particle collection devices, and air heaters.

Figure 2:
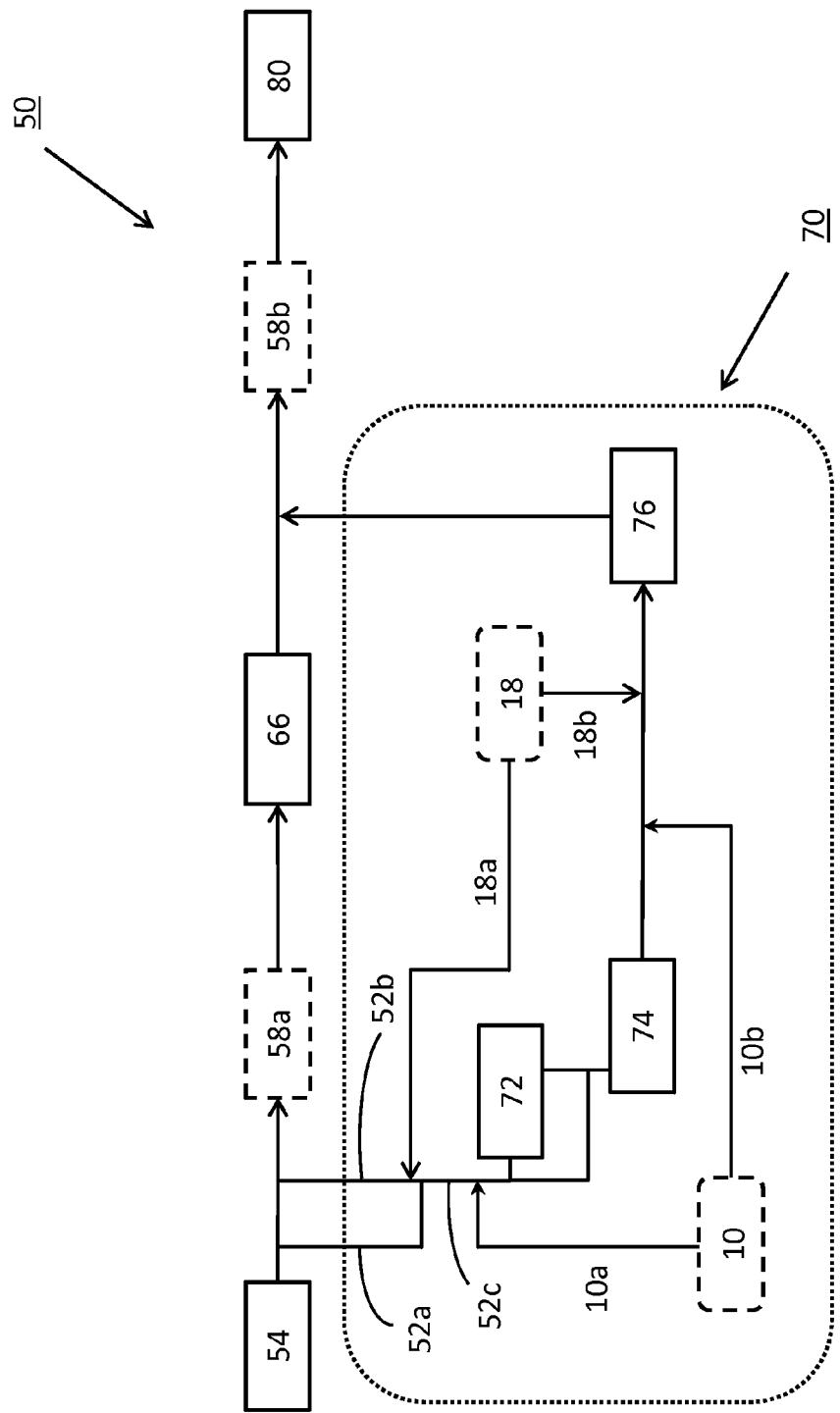
FIG. 2 is a flow chart of a coal-fired power plant with a slipstream.

A power plant can be outfitted with a slipstream, configured for a portion of the flue gas to bypass the main path and allow testing to be performed on a smaller scale, as illustrated in FIG. 2. FIG. 2 schematically illustrates the configuration for a power plant at the Mercury Research Center at Gulf Power Company's Plant Crist Unit 5 in Pensacola, Fla. Power plant 52 comprises a boiler 54 from which flue gas is directed to a hot side electrostatic precipitator (ESP) that can be positioned upstream (hot side ESP 58a) or downstream (cold side ESP 58b) of air heater 66. Scrubber 80 is positioned further downstream of air heater 66 and ESP 58a or ESP 58b for removal of other pollutants such as $SO_x$ and $NO_x$.

For testing mercury removal in the presence of $SO_3$, unit 52 is outfitted with a slipstream 70 (inside dotted outline) containing hot side 52a and cold side 52b bypass pathways that converge to pathway 52c to generate flue gas having a temperature that is the average of the hot side and cold side gases. The flue gas entering slipstream 70 optionally passes through a scrubber 72, air heater 74, and particle collection device 76, which includes an ESP or baghouse. Sorbent 10 can be injected into inlets 10a (hot side) or 10b (cold side). Similarly, the injection of $SO_3$ 18 can occur on the hot side (18a) or cold side (18b). Mercury concentration can monitored before and after injection of sorbent 10 and $SO_3$ 18 upstream and downstream of particle collection device 76. Outlet concentration of mercury is measured with a continuous emission measuring system. Inlet concentration is measured using sorbent traps. Sorbent traps are evaluated using an Ohio Lumex.

In some instances, e.g., for high $SO_3$ flue gas streams, the significantly higher concentration of $SO_3$ coupled with the ability of $SO_3$ to competitively bind to activated carbon can present a challenge for mercury removal. It has also been discovered that the disclosed fine particle size material has increased cohesive strength relative to the feedstock activated carbon. The increase in cohesive strength may affect the flow in feed systems at coal fired power plants, resulting in poorer feedability of the sorbent. It has also been discovered that fine particle size activated carbon can bridge during storage (e.g., in a hopper or a silo).

Disclosed herein is a composition comprising an increased number of binding sites to accommodate adsorption by both mercury and $SO_3$. Accordingly, one embodiment provides a composition comprising activated carbon and silica, such as fumed silica. Fumed silica comprises primary silica particles strongly fused to form aggregates, which in turn are weakly associated with other aggregates to form agglomerates. Exemplary fumed silicas for flow control include those sold under CAB-O-SIL®, available from Cabot corporation, including CAB-O-SIL® M-5, PTG, MS-55, EH-5, TS-720, TS-610, and TS-530. The results in increased flow properties of the activated carbon such that the number of accessible binding sites is increased.

In one embodiment, the silica, e.g., fumed silica, is present in composition comprising activated carbon in an amount ranging from 0.05% to 2% by weight, e.g., from 0.1% to 2% by weight, relative to the total weight of the composition. In one embodiment, the composition comprising the activated carbon is a powdered material. In another embodiment, the silica is present in the composition in an amount ranging from 0.05% to 1.5% by weight, e.g., from 0.05% to 1% by weight, from 0.05% to 0.5% by weight, from 0.1% to 2% by weight, 0.1% to 1.5% by weight, from 0.1% to 1% by weight, or from 0.1% to 0.5% by weight relative to the total weight of the composition.

It has also been discovered that a composition comprising fine particle size activated carbon and silica (e.g., fumed silica) can have improved flow properties compared to a composition comprising activated carbon without the silica. Another embodiment provides a method of mercury removal, comprising injecting a composition comprising activated carbon and silica (e.g., fumed silica) into flue gas generated from coal combustion, wherein the activated carbon has a $d_{95}$ particle size distribution ranging from 1 µm to 28 µm and a ratio of $d_{95}/d_{50}$ ranging from 1.5 to 3. The silica can be present in the composition in amounts ranging from 0.05% to 2% by weight, relative to the total weight of the composition, or in other amounts as disclosed herein.

EXAMPLES

All particle sizes were measured as liquid dispersions with an LS™ 13 320 or an LS™ 200 Laser Diffraction Particle Size Analyzer, both available from Beckman Coulter.

Example 1: Preparation of Fine Particle Size Activated Carbon Via Jet Milling/Air Classification Feedstock lignite-based, brominated, activated carbon used was DARCO® Hg-LH Extra, commercially available from Cabot Corporation—Norit Activated Carbon. The mill used was an Alpine AFG 400 jet mill from Hosokawa.

Table 1 below provides the operating conditions for the jet mill, and the properties of the feedstock and milled activated carbons.

TABLE 1

| Operating Conditions | | | | |
|---|---|---|---|---|
| | Feedstock | Sample A1 | Sample B | Sample C1 |
| Wheel Speed [RPM] | N/A | 6000 | 5000 | 4000 |
| Air Pressure [psi] | N/A | 90 | 100 | 100 |
| Tip Size [mm] | N/A | 6.3 | 6.3 | 8.0 |
| $d_{10}$ [μm] | 1.4 | 1.0 | 1.0 | 1.4 |
| $d_{50}$ [μm] | 15.9 | 2.6 | 3.2 | 6.4 |
| $d_{95}$ [μm] | 53.5 | 6.3 | 8.7 | 16.3 |
| Throughput [lb/hr] | N/A | 100 | 140 | 400 |

Example 2: Preparation of Fine Particle Size Activated Carbon Via Hammer Milling/Air Classification In this Example, a feedstock activated carbon was subjected to hammer milling and air classification. The properties of the feedstock lignite-based activated carbon are provided in Table 2 below.

TABLE 2

| | |
|---|---|
| Moisture [%] | 0.87 |
| Ash [%] | 40.3 |
| Molasses RE [db] | 85 |
| Iodine Number [mg/g] | 495 |
| +4 Mesh [%] | 11 |
| 4-8 Mesh [%] | 81 |
| 8 × 30 Mesh [%] | 8 |
| −30 Mesh [5] | 1 |
| Average Particle Diameter [mm] | 3.6 |

This feedstock was milled with a Mikro-ACM® 100 hammer mill/air classifying mill from Hosokawa. Table 3 below provides the operating conditions and the properties of the milled activated carbons.

TABLE 3

| Sample D | |
|---|---|
| Grinder Power [HP] | 100 |
| Rotor Motor Speed [Hz] | 60 |
| Air Rate [aCFM] | 8300 |
| Feed Rate [lb/hr] | 500 |
| Classifier Power [HP] | 15 |

TABLE 3-continued

| Sample D | |
|---|---|
| Classifier VFD [Hz] | 60 |
| Rotor Tip Speed [ft/s] | 17500 |
| $d_{10}$ [μm] | 1.9 |
| $d_{50}$ [μm] | 8.9 |
| $d_{95}$ [μm] | 23.9 |

Example 3: Hg Removal with Jet Milled/Air Classified Activated Carbon

This Example demonstrates the Hg removal capability of jet milled/air classified, brominated activated carbon prepared in the same manner as Sample C1 of Example 1 (Sample C2). These results were compared with a granular activated carbon that was milled with a Model B lab roller mill from the Williams Patent Crusher and Pulverizer Co., and then brominated using the same method as described in U.S. Pat. No. 8,551,431, the disclosure of which is incorporated herein by reference (Comparative Sample A). Mercury removal experiments were performed at the Mercury Research Center at Gulf Power Company's Plant Crist Unit 5 in Pensacola, Fla., on a slip stream of a coal fired power plant with a 75 MWe unit having a slip stream equivalent to 5 MWe. The unit is schematically illustrated in FIG. 2. Sorbent injection was performed on the cold side of the air heater (10b). The samples were fed to the unit with a calibrated gravimetric feeder. $SO_3$ concentration is reported in the tables below. Temperature at the hot side ranged from 675-690° F., at the ESP inlet (cold side) from 285-300° F., and at the ESP outlet at 270-280° F. The unit flue gas flow rate was roughly 20,000 actual cubic feet per minute (aCFM).

The particle size distribution of Sample C2 and Comparative Sample A are shown in Table 4, and the Hg removal data shown in Table 5 below.

TABLE 4

| | Comp. Sample A | Sample C2 |
|---|---|---|
| $d_5$ | 2.2 | |
| $d_{10}$ | | 1.4 |
| $d_{50}$ | 7.7 | 6.8 |
| $d_{90}$ | | 15.3 |
| $d_{95}$ | 30.7 | 17.4 |

TABLE 5

| | Rate [lb/MMacf] | Start Time | End Time | Removal at 3% $O_2$ [%] | Adjusted Removal [%] |
|---|---|---|---|---|---|
| Sample C2 (12.7 ppm $SO_3$) | 0.0 | 14:03 | 14:13 | 0.406 | 0.000 |
| | 3.3 | 14:23 | 14:29 | 0.533 | 0.127 |
| | 6.7 | 14:34 | 14:49 | 0.609 | 0.203 |
| | 10.0 | 15:03 | 15:24 | 0.671 | 0.265 |
| Comp Sample A (9.3 ppm $SO_3$) | 0.0 | 9:26 | 9:59 | 0.422 | 0.000 |
| | 3.3 | 10:13 | 10:26 | 0.496 | 0.074 |
| | 6.7 | 10:35 | 10:54 | 0.567 | 0.145 |
| | 10.0 | 11:05 | 11:20 | 0.622 | 0.200 |
| | 13.3 | 11:25 | 11:32 | 0.694 | 0.272 |
| | 16.7 | 11:50 | 11:56 | 0.777 | 0.355 |

Figure 3A:
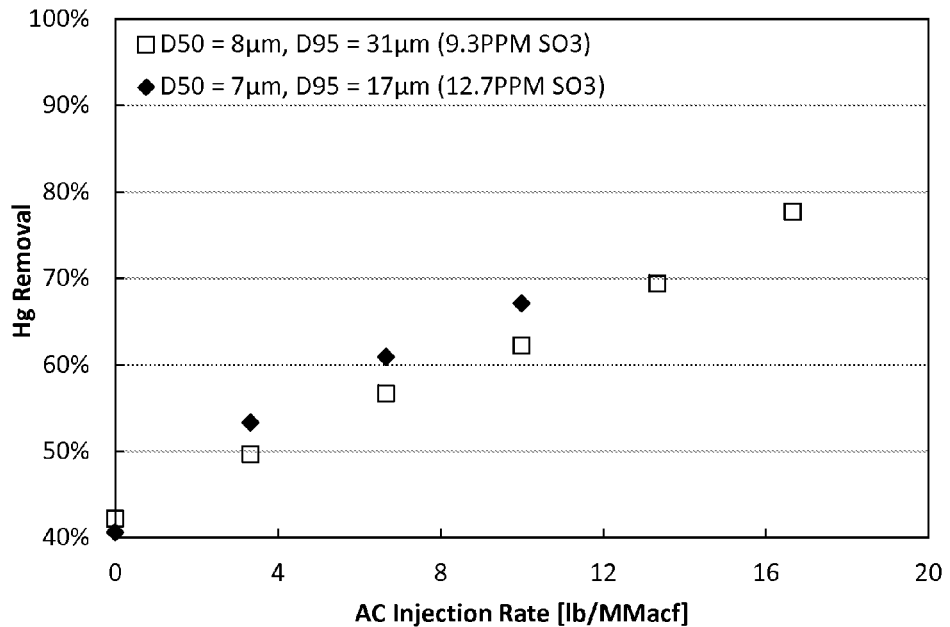
FIG. 3A is a plot of Hg removal versus injection rate for the activated carbon samples Example 3 where the outlet Hg concentration is adjusted to 3% $O_2$.
Figure 3B:
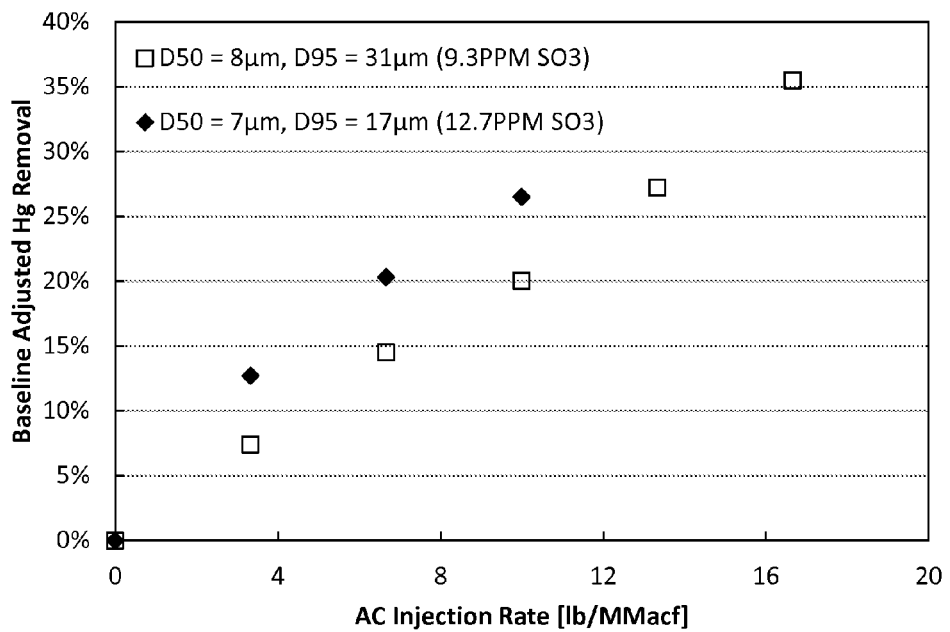
FIG. 3B is the adjusted Hg removal plot.

The data of Table 5 is also plotted at FIGS. 3A and 3B, showing Hg removal versus injection rate for the activated carbon samples (FIG. 3A: Hg removal at the outlet adjusted to 3% $O_2$; FIG. 3B: adjusted Hg removal). It can be seen that the activated carbon having a low $d_{95}$ value (Sample C2) achieves a higher Hg removal rate than that of Comparative Sample A, even at a higher $SO_3$ concentration (12.7 ppm $SO_3$ versus 9.3 ppm $SO_3$ for Comparative Sample A). Hg levels at the inlet were determined via sorbent traps upstream of activated carbon injection. Sorbent trap mercury levels were measured using a calibrated Ohio Lumex RA-915+ Zeeman Mercury Spectrometer with RP-M324 & RP-M324M attachments.

Example 4: Hg Removal with Hammer Milled/Air Classified Activated Carbon

In this activated carbon of Example 2 (Sample D) is brominated in the manner described in U.S. Pat. No. 8,551,431, the disclosure of which is incorporated herein by reference to form Sample D1. Sample D1 is then tested for Hg removal with the method described in Example 3, and the results are compared with the product of ball milling the feedstock DARCO® Hg-LH Extra (Comparative Sample B). The ball milling was performed with 4 different media sizes of ½", ¾", 1" and 1¼" (approximately 25% each) until the particle size shown below in Table 6 was achieved. The particle sizes of both samples are shown in Table 6, and the Hg removal data shown in Table 7. Note that Comparative Sample B and Sample D1 are compared on a volumetric basis to account for the difference in activity. In this example, the starting materials for the brominated product had different activity levels, and thus different densities. To account for this difference, the data are presented and compared on a volumetric basis in Table 7.

TABLE 6

|  | Comp Sample B* | Sample D1 |
|---|---|---|
| $d_5$ (μm) | 2.5 | 1.9 |
| $d_{50}$ (μm) | 12.2 | 9.6 |
| $d_{95}$ (μm) | 76.3 | 27.9 |
| Tamped Density (ft³/lb) | 32.7 | 44.3 |

*The measured particle size of the ball milled sample (Comp Sample B) increased due to flocculation; however during Hg removal testing, the particle will likely disentangle.

TABLE 7

|  | Rate [lb/MMacf] | Rate [ft3/MMacf] | Start Time | End Time | Removal at 3% $O_2$ [%] | Adjusted Removal [%] |
|---|---|---|---|---|---|---|
| Sample D/Br | 0.0 | 0.00 | 13:05 | 13:28 | 0.361 | 0.000 |
| 4% Br (14.0 | 3.3 | 0.08 | 13:43 | 13:55 | 0.466 | 0.105 |
| ppm SO3) | 6.7 | 0.15 | 14:09 | 14:15 | 0.524 | 0.163 |
|  | 10.0 | 0.23 | 14:35 | 14:47 | 0.583 | 0.222 |
| Comp | 0.0 | 0.00 | 8:35 | 8:50 | 0.314 | 0.000 |
| Sample | 3.3 | 0.10 | 9:04 | 9:15 | 0.413 | 0.099 |
| B/Br (8.1 | 6.7 | 0.20 | 9:23 | 9:35 | 0.478 | 0.164 |
| ppm SO3) | 10.0 | 0.31 | 9:44 | 9:58 | 0.547 | 0.233 |

Figure 4A:
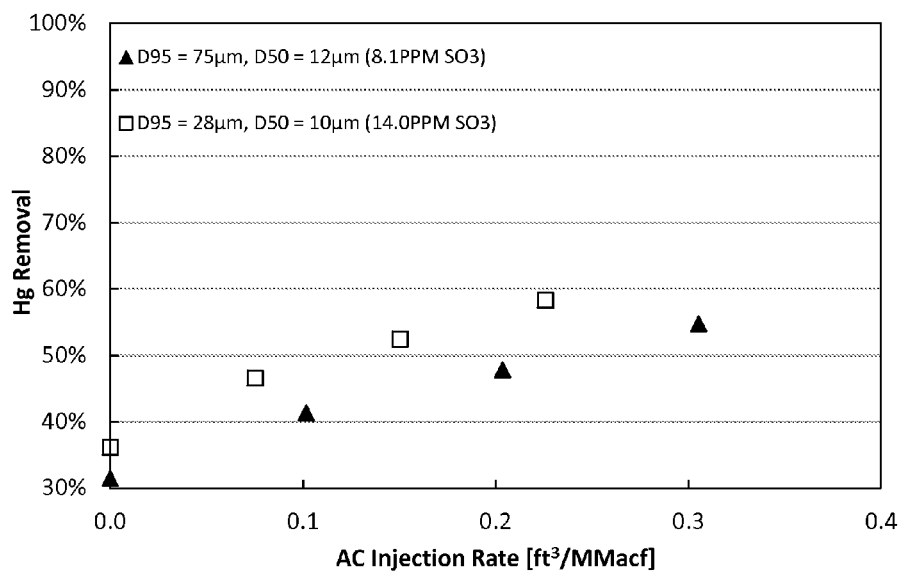
FIG. 4A is a plot of Hg removal versus injection rate for the activated carbon samples Example 4 where the outlet Hg concentration is adjusted to 3% $O_2$.
Figure 4B:
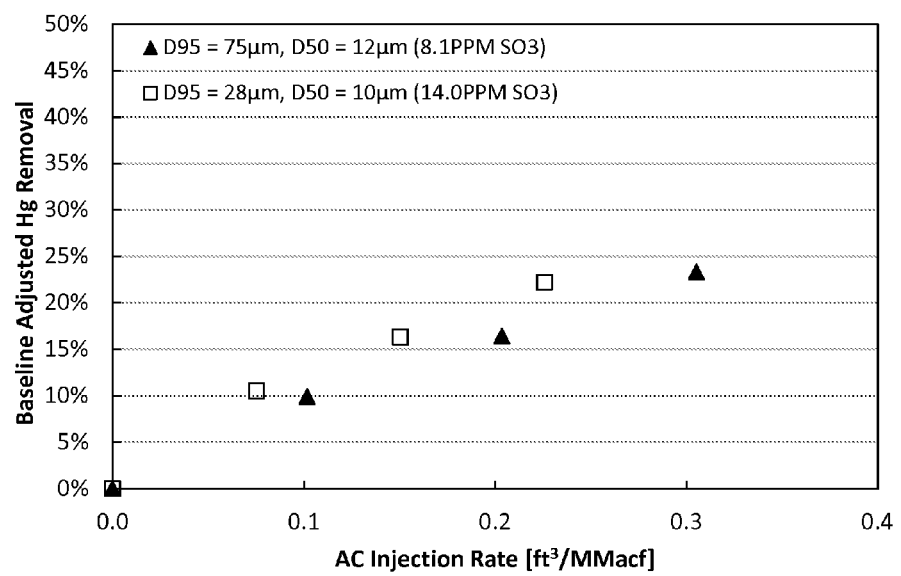
FIG. 4B is the adjusted Hg removal plot.

This data is also plotted in FIGS. 4A and 4B, showing Hg removal versus injection rate for the activated carbon (FIG. 4A: Hg removal at 3% $O_2$; FIG. 4B: adjusted Hg removal). It can be seen that the activated carbon having a low $d_{95}$ value (Sample D1) achieves a higher Hg removal rate than that of Comparative Sample B.

Example 5: Hg Removal with Jet Milled/Air Classification, and Air Classification Only (Cyclone) Activated Carbon This Example shows Hg removal data (Hg removal performed with the method described in Example 3) for a brominated activated carbon subjected to jet milling/air classifying in a manner similar to that of Sample A1 of Example 1 (Sample A2). This Example also shows Hg removal data for activated carbon subjected to air classifying only via cyclone, which was then brominated by the method described in Example 4 (Sample E). This data is compared with Hg removal data for DARCO® Hg-LH Extra (Comparative Sample C). Table 8 below shows the particle size distribution for Sample A2, Sample E (as well as the prebrominated particle size distribution), and Comparative Sample C, and Table 9 shows the corresponding Hg removal data.

TABLE 8

|  | Sample A2 | Sample E | Pre brominated Sample E | Comp Sample C |
|---|---|---|---|---|
| $d_5$ |  | 2.4 | 2.0 | 2.8 |
| $d_{10}$ | 1.227 | 2.9 |  |  |
| $d_{50}$ | 3.028 | 6.0 | 4.5 | 16.4 |
| $d_{90}$ | 5.995 | 14.8 |  |  |
| $d_{95}$ | 6.819 | 20.0 | 14.1 | 53.3 |

TABLE 9

|  | Rate [lb/MMacf] | Start Time | End Time | Removal at 3% O2 [%] | Adjusted Removal [%] |
|---|---|---|---|---|---|
| Sample A2 | 6.7 | 10:32 | 10:48 | 0.634 | 0.320 |
| (8.1 ppm SO3) | 10.0 | 10:52 | 11:21 | 0.804 | 0.490 |
| Sample E | 6.7 | 18:23 | 18:29 | 0.640 | 0.289 |
| (9.2 ppm SO3) | 10.0 | 18:40 | 18:56 | 0.741 | 0.390 |
|  | 0.0 | 12:23 | 12:40 | 0.324 | 0.000 |
|  | 6.7 | 14:25 | 14:39 | 0.600 | 0.276 |
|  | 10.0 | 15:05 | 15:19 | 0.722 | 0.398 |
| Comp Sample C | 0.0 | 12:23 | 12:40 | 0.324 | 0.000 |
| (9.2 ppm SO3) | 3.3 | 13:22 | 13:29 | 0.422 | 0.098 |
|  | 6.7 | 13:36 | 13:48 | 0.512 | 0.188 |
|  | 10.0 | 13:55 | 14:13 | 0.582 | 0.258 |

Figure 5A:
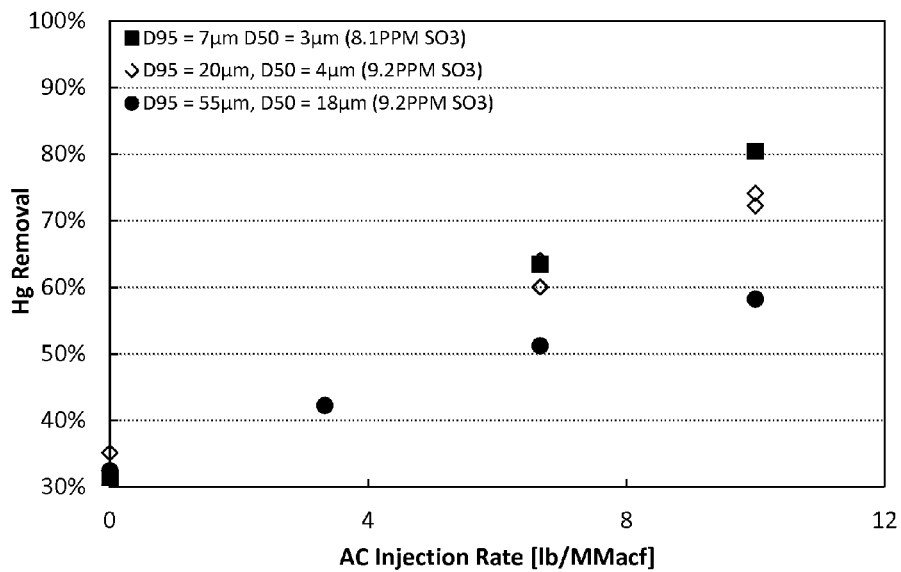
FIG. 5A is a plot of Hg removal versus injection rate for the activated carbon samples Example 5 where the outlet Hg concentration is adjusted to 3% $O_2$.
Figure 5B:
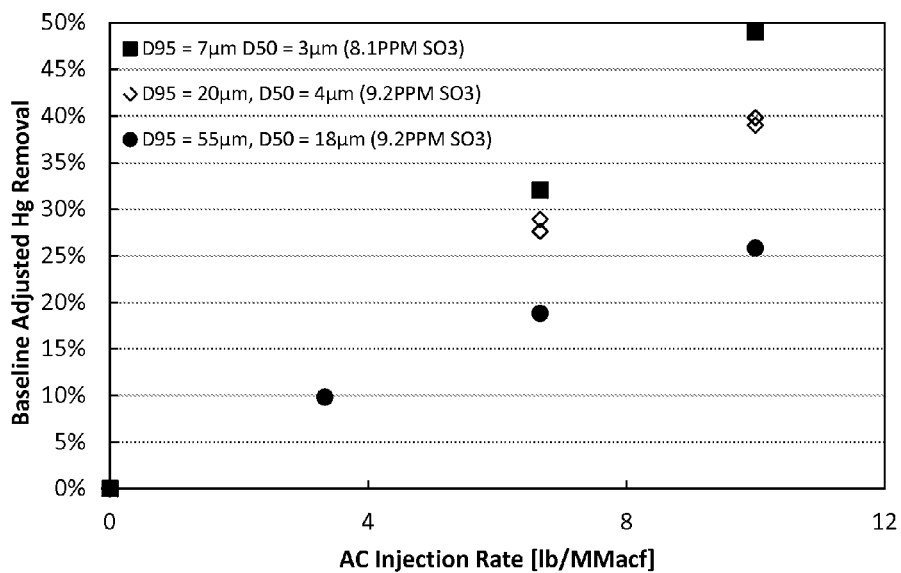
FIG. 5B is the adjusted Hg removal plot.

This data is also plotted in FIGS. 5A and 5B, showing Hg removal versus injection rate (FIG. 5A: Hg removal at 3% $O_2$; FIG. 5B: adjusted Hg removal). It can be seen that the activated carbons having a low $d_{95}$ and $d_{50}$ value achieves a higher Hg removal rate than that of Comparative Sample C.

Example 6: Addition of Silica to Fine Particle Size Activated Carbon

In this Example, a fumed silica (CAB-O-SIL® M-5) was added to the activated carbon Sample B of Example 1 in the amounts indicated in Table 10. Table 10 also shows cohesive strength (kPa, right hand column) and major consolidation stress (kPa, left hand column) for each silica blend.

TABLE 10

| Silica (wt %) | | | | | | | | | |
|---|---|---|---|---|---|---|---|---|---|
| 0 | | 0.05 | | 0.1 | | 0.25 | | 0.5 | |
| 0.860 | 0.622 | 0.849 | 0.646 | 0.852 | 0.637 | 0.854 | 0.635 | 0.813 | 0.586 |
| 1.976 | 1.292 | 1.840 | 1.208 | 1.880 | 1.152 | 1.842 | 1.273 | 1.979 | 1.197 |
| 4.207 | 2.358 | 4.044 | 2.160 | 4.128 | 2.124 | 4.274 | 2.014 | 4.335 | 1.910 |
| 9.490 | 4.413 | 9.438 | 4.038 | 9.505 | 3.861 | 9.369 | 4.019 | 9.570 | 3.827 |

Figure 6:
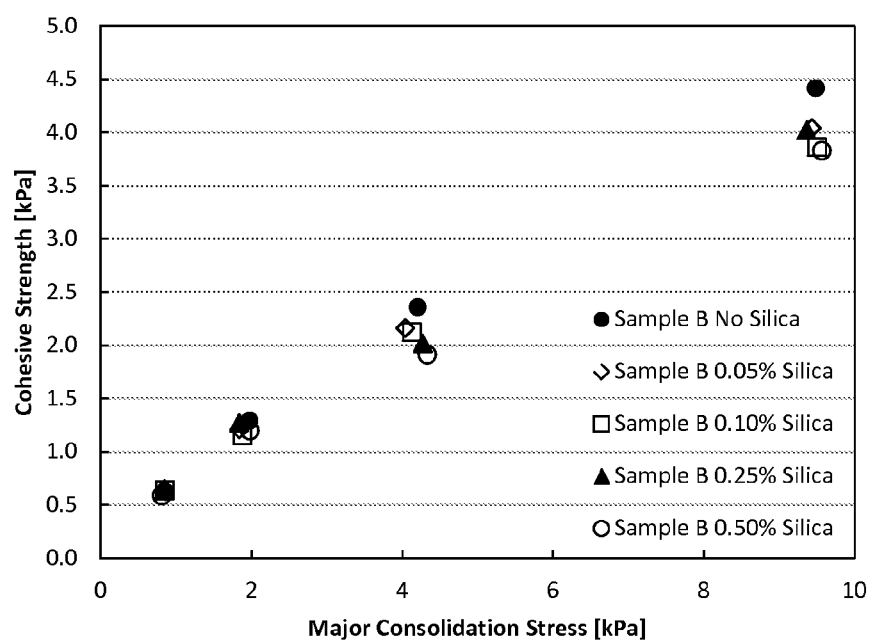
FIG. 6 is a plot of cohesive strength of a composition comprising fine particle size activated carbon and silica, as a function of major consolidation stress.

This data is also plotted in FIG. 6, showing the cohesive strength as a function of major consolidation stress. It can be seen that there is a benefit of adding silica as a flow aid for the reduction of cohesive strength, which improves the ability to convey the material.

Example 7: Preparation of Fine Particle Size Activated Carbon Via eACM

In this Example, the feedstock of Example 2 (Table 2) was subjected particle size reduction via a Mikro e-ACM® Air Classifying Mill from Hosokawa from Hosokawa ("eACM"). Operating conditions for the eACM are shown in Table 11.

TABLE 11

| Mill Type | 15 eACM |
|---|---|
| Material Type | Darco FGD |
| Rotor Type | 8 Flag Type (TC Tipped) |
| Rotor RPM | 7,000 |
| Rotor Amps (Idle) | 9.9-10.0 |
| Rotor Amps (Load) | 18.8-19.2 |
| Classifier RPM | 1,750 |
| Classifier Amps (Idle) | 1.95-1.96 |
| Classifier Amps (Load) | 1.93-1.97 |
| Eductor Pressure (psig) | 80 |
| Eductor Flow (SCFM) | 20 |
| Eductor Gate Setting | 100% Open |
| Liner Type | Multiple Deflector Ceramic |
| Airflow (CFM) | 500 |
| Mill Pressure (in WG) | 20/25 |
| System Pressure (in WG) | 30/40 |
| Blower Speed (Hz) | 30.3/35.7 |
| Blower Amps | 21.2/22.9 |
| Mill Outlet Temp (° C.) | 108/130 |
| Feed Amount (lb) | 400.0 |
| Time (MIN) | 30.4 |
| Capacity (lb/hr) | 769 |

The resulting fine particle size activated carbon had a $d_{50}$ of 9.17 μm, a $d_{95}$ of 28.7 μm, and a $d_{95}/d_{50}$ ratio of 2.87 ("Sample F").

Figure 7:
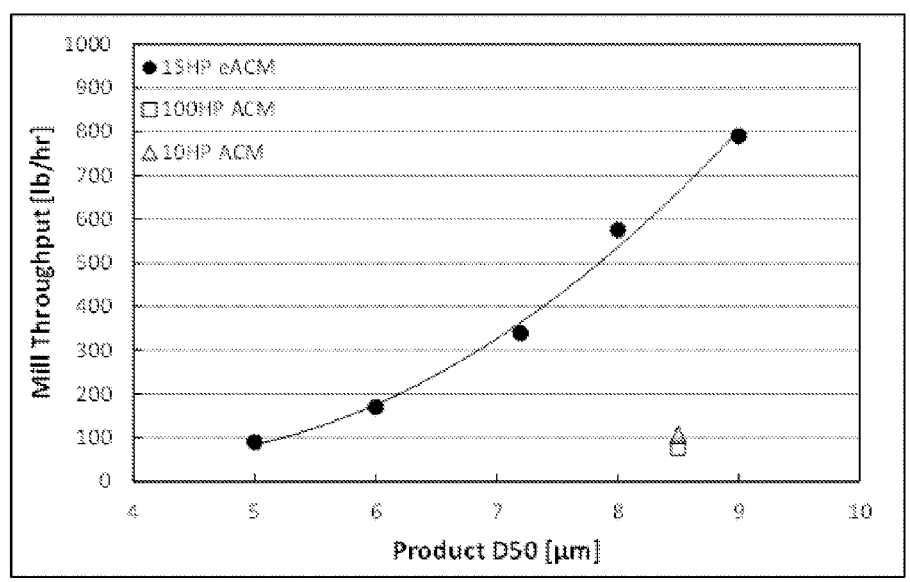
FIG. 7 is a plot of mill throughput (lb/hr) for various $d_{50}$ particle size distributions, including Sample F of Example 7.

The mill throughput performance for the eACM is noticeably higher than those of a standard design when adjusted for mill size (horsepower). FIG. 7 is a plot of the mill throughput (lb/hr) for various $d_{50}$ particle size distributions. The eACM mill at 15 HP achieves a significantly greater throughput for particles having a $d_{50}$ particle size distribution of 8-9 μm (see Sample F) compared to a standard ACM operating at 100 HP or a 10 HP for particles of a similar size range. FIG. 7 also shows that smaller particle sizes ($d_{50}$ ranging from 5 μm to 8 μm) can also be achieved at high throughput with increased classifier speeds.

Example 8: Hg Removal with Fine Particle Size Activated Carbon Prepared by eACM This Example demonstrates the Hg removal capability of the fine particle size activated carbon from Example 7 ("Sample F") as compared with an activated carbon having a $d_{95}/d_{50}$ ratio of 3.19 ("Comparative Sample D"), and DARCO® Hg-LH Extra, commercially available from Cabot Corporation—Norit Activated Carbon, ("Comparative Sample E"). The respective particle size distributions and ratios are provided in Table 12.

TABLE 12

| Sample | $d_{50}$ [μm] | $d_{95}$ [μm] | Ratio [—] |
|---|---|---|---|
| Sample F | 9.17 | 26.4 | 2.88 |
| Comp D | 7.86 | 25.1 | 3.19 |
| Comp E | 14 | | 3.56 |

Sample F and Comparative Sample E were brominated as described in Example 3. (Comparative Sample D was obtained in brominated form.). Mercury removal experiments were performed at the Emission Control Research Facility (ECRF) located within Sask Power's Poplar River Plant (Coronach, SK.), on a slip stream of a coal fired power plant. The slip stream is equivalent to 0.5 MWe with an approximate flue gas flow rate of 2000 actual cubic feet per minute (aCFM). Particulate control was achieved with an electrostatic precipitator (ESP), and mercury removal across the ESP was measured by Tekran® 2537 CEMs. Sorbent injection was performed upstream of the electrostatic precipitator at a temperature of roughly 150° C., though the temperature may be moderated up to roughly 180° C. The ECRF does not have upstream or downstream of the air preheater (APH) injection ports because there is no APH in the slip stream unit. Instead, the desired temperature of flue gas is achieved by blending flue gas from upstream and downstream of the main plant APH. Results are shown in Table 13.

TABLE 13

| Sample | Rate [g/hr] | Rate [lb/MMacf] | Start Time | End Time | Removal at Inlet O2 [%] | Adjusted Removal [%] |
|---|---|---|---|---|---|---|
| Sample F | 75 | 1.38 | 13:15 | 13:27 | 0.542 | 0.530 |
| | 91 | 1.67 | 13:35 | 13:47 | 0.572 | 0.559 |
| | 133 | 2.44 | 13:55 | 14:07 | 0.641 | 0.629 |
| Comp D | 75 | 1.38 | 10:07 | 10:20 | 0.524 | 0.511 |
| | 91 | 1.67 | 10:27 | 10:40 | 0.571 | 0.558 |
| | 133 | 2.44 | 10:47 | 11:00 | 0.649 | 0.636 |
| Comp E | 30 | 0.54 | 14:42 | 15:05 | 0.319 | 0.306 |
| | 59 | 1.08 | 15:12 | 15:25 | 0.420 | 0.408 |
| | 91 | 1.67 | 15:32 | 15:45 | 0.516 | 0.504 |
| | 133 | 2.44 | 15:52 | 16:05 | 0.602 | 0.590 |

Figure 8:
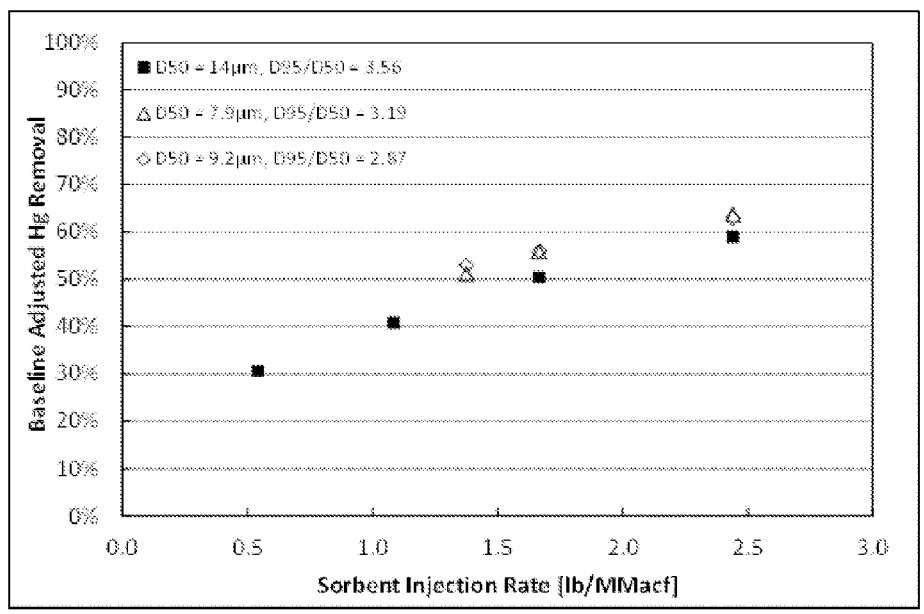
FIG. 8 is a plot of adjusted Hg removal versus sorbent injection rate for the samples of Example 8.

This data is also plotted in FIG. 8, showing adjusted Hg removal versus sorbent injection rate. It can be seen that Sample F achieves a higher Hg removal rate over the range of sorbent injection rates compared to that of Comparative Samples D and E.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of mercury removal, comprising:
   injecting activated carbon into flue gas generated from coal combustion,
   wherein the activated carbon has a $d_{95}$ particle size distribution ranging from 1 μm to 28 μm and a $d_{95}/d_{50}$ ratio ranging from 1.5 to 3.

2. The method of claim 1, wherein the activated carbon has a $d_{95}/d_{50}$ ratio ranging from 2 to 3.

3. The method of claim 1, wherein the activated carbon has a $d_{95}/d_{50}$ ratio ranging from 2.5 to 3.

4. The method of claim 1, wherein the activated carbon has a $d_{95}$ particle size distribution ranging from 1 μm to 26 μm.

5. The method of claim 1, wherein the activated carbon has a $d_{50}$ particle size distribution ranging from 1 μm to 18 μm.

6. The method of claim 1, wherein the activated carbon has a $d_{90}$ particle size distribution ranging from 1 μm to 13 μm.

7. The method of claim 1, wherein the activated carbon has a $d_{99.9}$ particle size distribution ranging from 5 μm to 15 μm.

8. The method of claim 1, wherein the activated carbon is a halogenated activated carbon.

9. The method of claim 1, wherein the activated carbon is provided as a composition further comprising silica in an amount ranging from 0.05% to 2% by weight relative to the total weight of the composition.

10. A method of mercury removal, comprising:
    injecting activated carbon into flue gas generated from coal combustion,
    wherein the activated carbon has a $d_{95}$ particle size distribution ranging from 1 μm to 28 μm, a $d_{50}$ particle size distribution ranging from 8 μm to 18 μm, a $d_{95}/d_{50}$ ratio ranging from 1.5 to 3.

* * * * *